Figure 1:
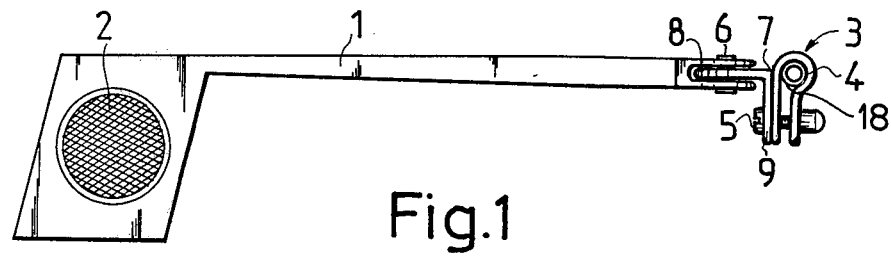

United States Patent [19]

Ruppa

[11] 4,321,883
[45] Mar. 30, 1982

[54] SAFETY FLAG ATTACHMENT MEANS FOR BICYCLES, ETC.

[76] Inventor: Juhani Ruppa, Keltinmäentie 25 C 39, SF-40630 Jyväskylä 63, Finland

[21] Appl. No.: 80,942

[22] Filed: Oct. 1, 1979

[30] Foreign Application Priority Data

Aug. 2, 1979 [GB] United Kingdom ............ 991038/79

[51] Int. Cl.³ .............................. B60Q 1/34; B62J 5/20
[52] U.S. Cl. .............................. 116/35 A; 280/289 R; 350/97
[58] Field of Search ............ 116/173, 35 R, 52, 35 A; 85/36; 280/289 R, 289 E; 350/97

[56] References Cited

U.S. PATENT DOCUMENTS

| | | | |
|---|---|---|---|
| 2,183,622 | 12/1939 | Roan et al. | 116/52 |
| 2,476,226 | 7/1949 | Schwinn | 297/195 |
| 3,136,289 | 6/1964 | Johnson | 116/173 X |
| 3,362,737 | 1/1968 | Cobb | 85/36 X |
| 3,491,183 | 1/1970 | Brow | 85/36 X |
| 3,950,727 | 4/1976 | Smith | 116/51 |
| 3,961,596 | 6/1976 | Schiavone | 116/52 X |
| 3,967,575 | 7/1976 | Coutts | 116/35 A |
| 3,972,302 | 8/1976 | Sherman | 116/28 R |
| 3,982,771 | 9/1976 | Tropeano | 116/35 R |
| 4,116,154 | 9/1978 | Harris | 116/35 A |

Primary Examiner—Daniel M. Yasich
Attorney, Agent, or Firm—Woodling, Krost & Rust

[57] ABSTRACT

The safety flag of the invention relates to a reflector attached to one end of a stem and a fixing means attached to the other end. The fixing means is a fixing member for attachment to the bicycle, and a joint member which has been turnably attached to the fixing member with the aid of an axle and to which the stem has been pivoted with the aid of a pivot axle so that the pivot axle is substantially at right angles against the plane of the reflector and substantially crosswise with reference to the turning axle. The fixing member and the joint member constitute bearing surfaces urged against each other, and which may if desired be provided with ridges and with grooves corresponding to the ridges for securing the joint member together with the stem and reflector member in desired turned position with reference to the fixing member and thus to the bicycle.

10 Claims, 3 Drawing Figures

U.S. Patent  Mar. 30, 1982  4,321,883

SAFETY FLAG ATTACHMENT MEANS FOR BICYCLES, ETC.

The present invention concerns an attachment means for a safety flag.

In the art a safety flag is known which comprises a vertical rod for attachment to the bicycle and a flag attached to the upper end of the vertical rod. A safety flag of this type is an aid in noticing the bicyclist. However, the protection afforded by this safety flag to the bicyclist is doubtful and unsatisfactory; the said safety flag of prior art has informative character, but it is in no way a concrete obstacle to collision nor is it any protection to the bicyclist.

Furthermore, the fixing means of safety flags of prior art intended for their affixing on a bicycle are unsatisfactory. The point where the safety flag is attached, for instance the frame tube of the bicycle or the luggage rack, may present different inclinations on different bicycles, whereby the attaching of the safety flag is impeded, and different fixing means are required for different bicylces.

The object of the present invention is to provide an attachment means for a safety flag which affords better protection of the bicyclist than before. It is particularly an object of the invention: to provide a safety flag which better than ever before warns the car driver of the bicyclist and which in a concrete manner prevents the car from coming into the bicycle's immediate vicinity.

It is further an object of the invention: to provide a safety flag which is easily and rapidly attachable to any kind of bicycle independent of the angle of inclination of the fixing point, such as the frame tube or the luggage rack.

Regarding the circumstances which are characteristic to the invention reference is made to the claims.

The safety flag of the invention, having a length for instance 30-50 cm, preferably about 32-40 cm, can be easily attached horizontally to the bicycle so that the stem of the safety flag extends on the driveway side of the bicycle, on the left side of the bicycle in countries with right-hand traffic and on the right side of the bicycle in countries with left-hand traffic, up to a certain distance, consistent with its length, from its fixing point, that is the luggage rack or the frame tube of the bicycle. Furthermore, the safety flag of the invention may - thanks to the joint member belonging to the safety flag - be attached to an arbitrary point on the bicycle and to a point on the bicycle disposed at any conceivable angle. Thanks to the joint member and to the safety flag's joint with two axles, the stem of the safety flag with its reflector may also be turned to point to one side, regardless of the location and position in which the fixing member is mounted.

Figure 2:
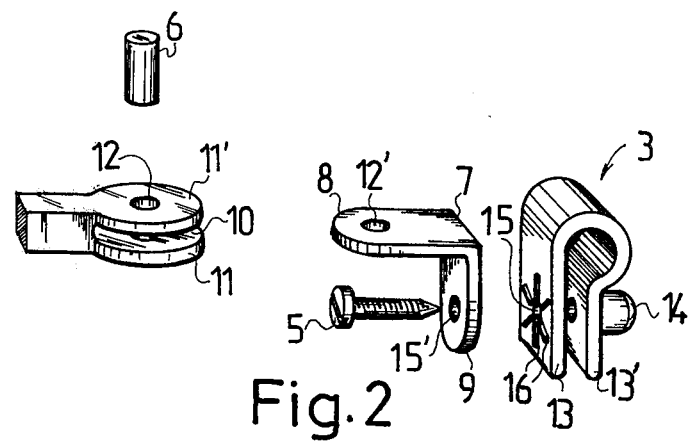
Figure 3:
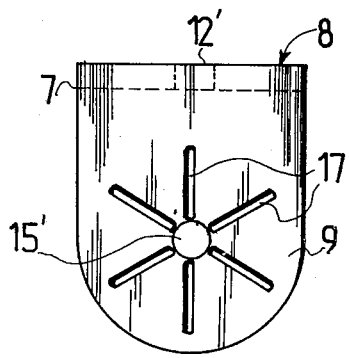

The invention is described in detail in the following with the aid of an embodiment example reference being made to the attached drawing, wherein:

FIG. 1 displays in elevational view, a safety flag according to the invention,

FIG. 2 presents the fixing member for the safety flag of FIG. 1 as an exploded view, the parts mutually separated, and FIG. 3 shows the joint member of the safety flag of FIGS. 1 and 2, viewed from the direction of the fixing member.

The safety flag disclosed by FIGS. 1-3 comprises an elongated, substantially rod-like stem 1, on the outer end of which a reflector 2 has been mounted and on the other end, the fixing means 3. The fixing means 3 comprises a fixing member 4 for attachment to the bicycle or other vehicle and a joint member 7, which has been attached to said fixing member through a turning axis with the aid of an axle 5 and to which the stem 1 has been pivotally attached with the aid of the pivot axle 6. Said pivot axle is substantially perpendicular against the substantially planar reflector 2 and substantially crossed with the axle 5.

The fixing member 3 is composed of a strap-like piece made of a resilient material, such as plastic for instance, and bent double, its parts 13,13' doubled over each other being provided with apertures 15 for the axle 5. The fixing member 3 is doubled over a point of attachment on a vehicle, usually a frame tube 18 of a bicycle. See FIG. 1. The fixing member 3 is rotatable around the point of attachment. This is the first axis of rotation of the device. The part 13 of the fixing member constitutes a mating part cooperating with the joint member, and a bearing surface perpendicular and centred with reference to the axle 5.

The joint member 7 comprises a joint part 9 meant to be pivotally attached to the fixing member by the axle 5, and another joint part 8 for pivotal attachment to the stem 1 by the pivot axle 6. In the joint part 9 an aperture 15' has been provided for the axle 5 the axis of the axle 5 is the second axis of the device. The joint part presents a bearing surface perpendicular against the pivot axle and centred with reference thereto, this surface being urged against the bearing surface of the fixing element 4 when the axle (that is, the fixing screw) affixes the joint member to the fixing member and clamps the fixing member around the object where it is clamped. The apertures 15, 15' are slightly larger in diameter than the screw that functions as the turning axle 5. When this screw is backed off, the part 13 can be moved in respect to its fixing point. The joint member 7 can be rotated around the turning axle 5. When this screw is tightened into counterpiece portion 14 however, the part 13 can no longer be moved and the joint member 7 cannot be rotated.

The other joint part 8 of the joint member 7 is plate-like and it has been introduced in the fork 10 defined between themselves by the two joint plates 11,11' belonging on the end of the stem 1. The joint plates 11,11' and the joint part of the joint member 7 have been provided with apertures 12,12' for the pivot axle 6. The axis of the pivot axle 6 is the third axis of the device. The pivot axle 6 has been placed in said aperture in order to bind the stem to the joint member.

The turning of the joint member 7 around the turning axle 5 in respect to the fixing member 4 and the pivoting of the stem 1 in respect to the joint member around the pivot axle 6 allows for compensation of the location and position in which the fixing member 4 is mounted to the bicycle. In addition the movement of the stem 1 around the pivot axle 6 allows the safety flag to fold back if it is struck.

The juncture constituted by the fixing member 4 and the joint member 7 is freely turnable. The bearing surfaces have, in the embodiment shown in the figures, been provided with detent means, as for example welts 16 radial with reference to the axle 5 and with grooves 17 consistent with these welts, for securing the arts together unturnably. The joint constituted by the joint member 7 and the stem 1 is a freely turnable friction joint. The axles of the joint member 7, i.e. the axle 5 and the pivot axle 6, are substantially at right angles against each other.

When the safety flag is attached to a bicycle, the joint between the fixing member 4 and the joint member 7 permits the stem 1 together with the reflector to be turned to be at right angles against the bicycle's travelling direction, as well in view from behind as possible and from the front, too. The friction joint constituted by the axle 5 enables the safety flag to be pointed to one side from the bicycle, at right angles to the direction of travel, independent of the position of the fixing member 4. Moreover, the latter joint allows pivotal turning of the safety flag in the direction of travel if it hits an obstacle, for instance a pedestrian, a car, a tree, etc.

The safety flag of the invention has been found, in studies that have been made, to prevent efficiently the traffic accidents in which bicyclists may become involved. The effect of the safety flag is obviously based on the fact that it constitutes a concrete obstacle to other vehicles so that these cannot come into touch with the bicycle without first touching the safety flag. Furthermore, the safety flag when placed approximately on the level of the highest point of the bicycle's luggage rack and/or rear mud guard and/or rear wheel, or in other words substantially on eye level of a passenger car driver, is easily observed and well displayed.

The embodiments of the means of the invention may vary within the scope of the claims following below. For instance, the pivot between the joint member 7 and the fixing member 4 may be any kind of pivot known in itself in the art, allowing the joint member to turn with reference to the fixing member. Further, the pivot between the joint member 7 and the stem 1 may be any kind of pivot known in itself in the art, allowing the stem 1 to turn with reference to the joint part in a direction at right angles against the stem. Further, the welts 16 formed on the bearing surface of the fixing member 4 and the grooves 17, consistent with the welts, formed on the bearing surface of the joint member 7 may be replaced by forming welts on the said bearing surface of the joint member and providing corresponding grooves on the respective bearing surface of the fixing member 4, for securing the joint member substantially unturnably to the fixing member. Similarly, the pivot between the stem 1 and the joint member 7 may be provided with locking ridges and corresponding grooves for securing the stem to the joint member. If desired, the axle 5 may consist of the fixing screw of the fixing member 4 with its counterpiece 14, which attach the joint member 7 to the fixing member 4 and clamp the fixing member at the fixing point; alternatively, the joint member may be attached by a separate axle or the like to the fixing member and the latter may be attached by a separated locking screw or the like to the fixing point.

I claim:

1. An attachment means for a safety flag having a stem and a reflector attached to one end of the stem, the attachment means comprising a fixing member for attachment to a vehicle, said fixing member consisting of a body made of a plastic material and bent double, its part bent double over each other and having been provided with apertures, said fixing member having a joint part, a joint member, said joint member having a mating part, an axle, said axle being through said apertures in said fixing member, said axle constitutes a screw with counterpiece, said screw and counterpiece also clamping said fixing member around the point of attachment to a part of the vehicle, said joint part of said fixing member and said mating part of said joint member being turnably connected by said axle and constituting bearing surfaces urging against each other for securing said joint member in desired position with references to said fixing member, the stem being pivoted to said joint member by the aid of a pivot axle and the axis of said pivot axle substantially crossing the axis of the turning axle.

2. The attachment means for a safety flag according to claim 1, characterized by there being formed on said bearing surfaces ridges on one and ridges and/or grooves on the other for securing said joint member in detented position with reference to said fixing member.

3. An attachment means for attaching a safety flag having a stem to a part of a vehicle, the attachment means comprising a strap, said strap being of a plastic material, said strap having two ends, one end of said strap having a bearing surface, said strap being bent double with said ends in relative alignment, a joint member, said joint member having two parts at right angles with each other, one of said two parts having a bearing surface, a screw, said screw being through said two ends of said strap and through said one of said two parts of said joint member, said bearing surface of said one end of said strap bearing against said bearing surface of said one of said two parts of said joint member, a counterpiece, said counterpiece being on the opposite side of said two ends of said strap and said one of said two parts of said joint member in respect to said screw, said screw selectively screwed into said counterpiece, said screw and counterpiece adjustably tightening said strap and holding one part of said two parts of said joint member in respect to said strap, a pivot axle, and said pivot axle pivotly mounting the stem of the safety flag to the second of said two parts of said joint member.

4. The attachment means for a safety flag according to claim 3, characterized in that there are detent means between said bearing surfaces of said one end of said strap and of said one of said two parts of said joint member to allow for the step adjustment of these two parts in respect to each other.

5. An attachment means for attaching a safety flag having a stem with a reflector attached to one end of the stem and an opposite end of the stem to a part of a vehicle, the attachment means comprising a strap, said strap having two ends, said strap being bent around the part of the vehicle with said two ends adjustably joined, said strap selectably rotatable in respect to the part of the vehicle about an axis, a joint member, means for attaching said joint member to said strap with said joint member selectably rotatable in respect to said strap about a second axis in respect rotatable in respect to said strap about a second axis in respect to said first axis and means for attaching the opposite end of the stem to said joint member with said stem selectably rotatable in respect to said joint member about a third axis in respect ot said first and second axis whereby the stem and the reflector of the safety flag can be oriented to face in any direction irrespective of the location of attachment of aid strap to the part of the vehicle.

6. An attachment means for a safety flag according to claim 5, characterized in that said two ends of said strap are joined by a screw and counterpiece, said screw and counterpiece selectively clamping said fixing member to the part of the vehicle, said screw and counterpiece also being said means for attaching said joint member to said fixing member.

7. An attachment means for a safety flag according to claim 6, characterized in that said fixing member has a bearing surface, said joint member has a bearing surface, said bearing surface of said fixing member bearing against said bearing surface of said joint member and there being ridges on one and ridges or grooves on the other of said bearing surfaces of said joint member and said fixing member for selectively detenting said joint member in respect to said fixing member.

8. An attachment means for attaching a safety flag having a stem with a reflector attached on one end of the stem and an opposite end of the stem for attachment to a frame tube of a vehicle, the attachment means comprising a strap, said strap having two ends, said strap being bent around the frame tube of the vehicle, a screw and counterpiece, said screw and counterpiece joining two ends of said strap, said strap being selectively adjustable against the frame tube in a first axis in respect to the frame tube of the vehicle, said screw and counterpiece selectively clamping said strap to the frame tube of the vehicle, said strap having a bearing surface surrounding said screw and counterpiece, a joint member, said joint member having a bearing surface, said joint member being adjustably attached to said strap by said screw and counterpiece with said bearing surface of said joint member bearing against said bearing surface of said strap, said joint member being selectively adjustable against said strap in a second axis in respect to the frame tube of the vehicle, said screw and counterpiece selectively clamping said joint member to said strap, said joint member having a second bearing surface, said second bearing surface of said joint member being generally perpendicular to said bearing surface of said joint member, the opposite end of the stem having a bearing surface, a pivot axle and the opposite end of the stem being attached to said joint member by said pivot axle with said bearing surface of the opposite end of the stem bearing against said second bearing surface of said joint member, the stem being selectively adjustable against said joint member in a third axis in respect to the frame tube of the vehicle, whereby the reflector of the safety flag can be oriented to face in any direction irrespective of the location of attachment of said strap to the frame tube of the vehicle.

9. An attachment means for a safety flag according to claim 8, characterized in that there being ridges on one and ridges or grooves on the other of said bearing surfaces of said joint member and said strap for selectively detenting said joint member in respect to said strap.

10. An attachment means for a safety flag according to claim 8, characterized in that said strap against the frame tube of the vehicle in the first axis in respect to the frame tube of the vehicle and said joint member against said strap in the second axis in respect to the frame tube are adjusted such that said axis of pivot axle and the third axis in respect to the frame tube are generally perpendicular to the ground upon which the vehicle rests in order that safety flag will retract in a plane parallel to the ground around the pivot axle and the third axis in respect to the frame tube when struck.

* * * * *